(12) United States Patent
Yamazaki

(10) Patent No.: US 7,956,836 B2
(45) Date of Patent: Jun. 7, 2011

(54) LIQUID CRYSTAL DISPLAY DEVICE HAVING BALANCED CLOCK SIGNAL LINES

(75) Inventor: Hiroshi Yamazaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1002 days.

(21) Appl. No.: 10/809,925

(22) Filed: Mar. 25, 2004

(65) Prior Publication Data

US 2004/0227715 A1 Nov. 18, 2004

(30) Foreign Application Priority Data

Mar. 31, 2003 (JP) .................. 2003-093903

(51) Int. Cl.
*G09G 3/36* (2006.01)
(52) U.S. Cl. .......................... 345/100; 345/99
(58) Field of Classification Search .............. 345/50, 345/213, 51, 33, 519, 211, 98, 99, 89, 100, 345/149, 269, 92, 42, 80; 257/72, 776; 359/85
See application file for complete search history.

(56) References Cited

U.S. PATENT DOCUMENTS

| | | | | |
|---|---|---|---|---|
| 5,274,600 A | * | 12/1993 | Ward et al. | 365/221 |
| 5,616,936 A | * | 4/1997 | Misawa et al. | 257/72 |
| 6,320,566 B1 | * | 11/2001 | Go | 345/99 |
| 6,323,836 B1 | * | 11/2001 | Shin | 345/99 |
| 6,335,721 B1 | * | 1/2002 | Jeong | 345/100 |
| 6,339,413 B1 | * | 1/2002 | Drake et al. | 345/50 |
| 6,373,458 B1 | * | 4/2002 | Yamakura et al. | 345/98 |
| 6,690,347 B2 | * | 2/2004 | Jeon et al. | 345/100 |
| 6,795,049 B2 | * | 9/2004 | Toyoshima et al. | 345/93 |
| 6,937,224 B1 | * | 8/2005 | Miyachi | 345/102 |
| 2003/0043126 A1 | * | 3/2003 | Fujino et al. | 345/204 |

FOREIGN PATENT DOCUMENTS

| | | |
|---|---|---|
| JP | 07-064519 | 3/1995 |
| JP | 407329337 A * | 12/1995 |
| JP | 08-076720 | 3/1996 |
| JP | 2000-250010 | 9/2000 |
| JP | 2001-084053 | 3/2001 |
| KR | 10-2002-0057243 | 7/2002 |

* cited by examiner

*Primary Examiner* — Ricardo L Osorio
(74) *Attorney, Agent, or Firm* — Greer, Burns & Crain, Ltd.

(57) ABSTRACT

The present invention provides a liquid crystal display device which can effectively reduce electromagnetic radiation caused by clock signals or data signals. In a liquid crystal display device, a timing controller outputs a clock signal and a reverse clock signal. The clock signal and the reverse clock signal are transmitted to a clock signal line and a reverse clock signal line arranged in parallel to each other. The clock signal line is connected to normal terminals of data driver ICs, and the reverse clock signal line is connected to dummy terminals of the data driver ICs.

6 Claims, 18 Drawing Sheets

→ CLOCK SIGNAL
← REVERSE CLOCK SIGNAL

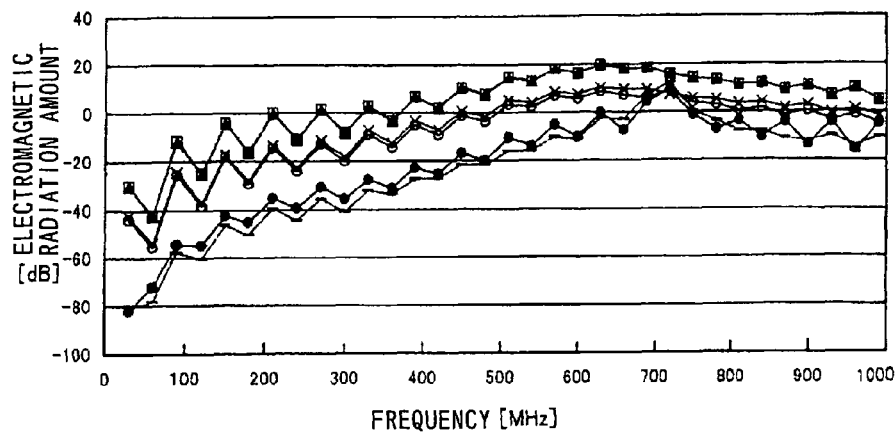
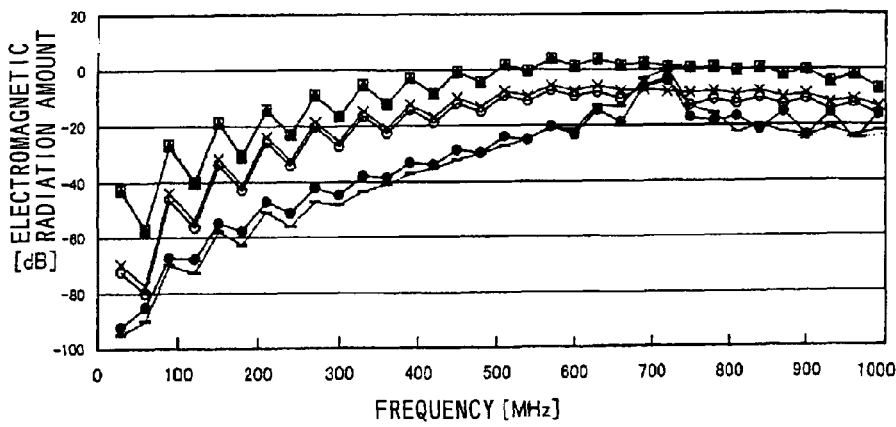
FIG.7

LIQUID CRYSTAL DISPLAY DEVICE HAVING BALANCED CLOCK SIGNAL LINES

BACKGROUND OF THE INVENTION

1. Field of the Invention

The present invention relates to a liquid crystal display device used in a monitor for a personal computer or the like.

2. Description of Related Art

Recently, in connection with popularization of personal computers using liquid crystal display devices, for example, a large-size and high-definition (high-resolution) screen has been strongly required in the market, and in order to satisfy this requirement, it is necessary to both enlarge a liquid crystal display portion and enhance the performance of various kinds of driving circuits at the same time.

FIG. 19 is a schematic diagram showing one example of a main part of a conventional liquid crystal display device. In FIG. 19, reference numeral 1 represents an active matrix type liquid crystal display panel, reference numerals 2-1, 2-2, 2-9 and 2-10 represent data driver ICs for outputting data signals to data lines formed on the liquid crystal display panel 1. The data drivers IC2-3 to IC2-8 are omitted from the illustration of FIG. 19.

Reference numerals 3-1 to 3-4 represent gate driver ICs for outputting gate signals to gate lines formed on the liquid crystal display panel 1, and reference numeral 4 represents a timing controller for receiving data signals, clock signals and synchronous signals, etc. from the main body of a personal computer and supplying various kinds of signals to the data driver ICs 2-1 to 2-10 and the gate driver ICs 3-1 to 3-4.

Reference numeral 5 represents a control circuit board on which the timing controller 4 is mounted, reference numeral 6 represents a wiring board equipped in association with the data driver ICs 2-1 to 2-10 and reference numeral 7 represents a wiring board equipped in association with the gate driver ICs 3-1 to 3-4.

Reference numeral 8 represents a data signal line for transmitting data signals output from the timing controller 4 to the data driver ICs 2-1 to 2-10, and reference numeral 9 represents a clock signal line for transmitting clock signals output from the timing controller 4 to the data driver ICs 2-1 to 2-10.

Reference numeral 10 represents a terminal circuit provided at the terminal of the clock signal line 9. (g) shows the circuit construction of the terminating circuit 10, reference numeral 11 represents a power supply line for supplying power supply voltage VCC (for example, 3.3V), reference numeral 12 represents a ground line for supplying earth voltage GND and reference numerals 13, 14 represent terminating resistors.

The data driver ICs 2-1 to 2-10 drive the data lines of the liquid crystal display panel 1 with the clock signals as a reference signal. However, in connection with the increase in screen size and the enhancement in screen resolution, the number of pixels has increased, and under the present situation, the speed of the clock signals must be increased in order to write data voltages to all the pixels. Therefore, the electromagnetic interference (EMI) problem has been induced by the increase of the speed of the clock signals, and thus it has been an important matter to take some countermeasure to this problem.

JP-A-2001-84053 (Patent Document 1) has proposed a technique for reducing electromagnetic radiation caused by clock signals. According to this technique, two-phase clock signals which are reverse to each other in phase are delayed to generate plural clock signals which are timely displaced in rise-up timing from one another, and the different clock signals thus generated are supplied to respective circuit blocks, thereby reducing the simultaneous switching number.

However, even when the technique disclosed in the Patent Document 1 is applied to the conventional liquid crystal display device shown in FIG. 19, the clock signal lines for transmitting the plural clock signals displaced in rise-up timing must be lengthened structurally. Therefore, there is a problem that it is impossible to effectively reduce the electromagnetic radiation due to an antenna design of the clock signal lines.

SUMMARY OF THE INVENTION

The present invention has been implemented in view of the foregoing situation, and has an object to provide a liquid crystal display device which can effectively reduce electromagnetic radiation caused by clock signals or data signals.

In order to attain the above object, according to a first aspect of the present invention, a liquid crystal display device including a liquid crystal display panel, plural data driver ICs for driving data lines of the liquid crystal panel and a first clock signal line for transmitting a first clock signal to the plural data driver ICs, is characterized by comprising: a second clock signal line which is equipped in parallel to the first clock signal line and transmits a second clock signal which is in reverse relation with the first clock signal, a timing controller for outputting the first and second clock signals to the first and second clock signal lines respectively; and loading means for making the load capacitance of the second clock signal line equal to or substantially equal to the load capacitance of the first clock signal line.

According to the first aspect of the present invention, the load capacitance of the first clock signal line for transmitting the first clock signal and the load capacitance of the second clock signal line for transmitting the second clock signal in reverse relationship with the first clock signal can be made equal or substantially equal to each other. Therefore, an offset effect can be induced between the first and second clock signals, and the electromagnetic radiation caused by the clock signals can be reduced.

According to a second aspect of the present invention, a liquid crystal display device including a liquid crystal display panel, plural data driver ICs for driving data lines of the liquid crystal panel, and a first clock signal line for transmitting a first clock signal to the plural data driver ICs, is characterized by comprising: a second clock signal line which is equipped in parallel to the first signal line and transmits a second clock signal which is in reverse relation with the first clock signal, and a timing controller for outputting the first and second clock signals to the first and second clock signal lines respectively, wherein the data driver ICs input the first and second clock signals, and can selectively latch data signals with the first or second clock signal.

According to the second aspect of the present invention, a half number of data driver ICs latch the data signals with the first clock signal, an the residual half number of data driver ICs latch the data signals with the second clock signal, so that the load capacitance can be equal or substantially equal between the first and second clock signal lines. Therefore, the offset effect can be induced between the first and second clock signals and thus the electromagnetic radiation caused by the clock signals can be reduced.

BRIEF DESCRIPTION OF THE DRAWINGS

FIG. 7 is graphs showing the results of the third simulation executed by the inventor to verify the effect of the first embodiment of the present invention;

DETAILED DESCRIPTION OF THE PREFERRED EMBODIMENTS

First to fifth preferred embodiments according to the present invention will be described with reference to the accompanying drawings.

First Embodiment . . . FIGS. 1 to 8

Figure 1:
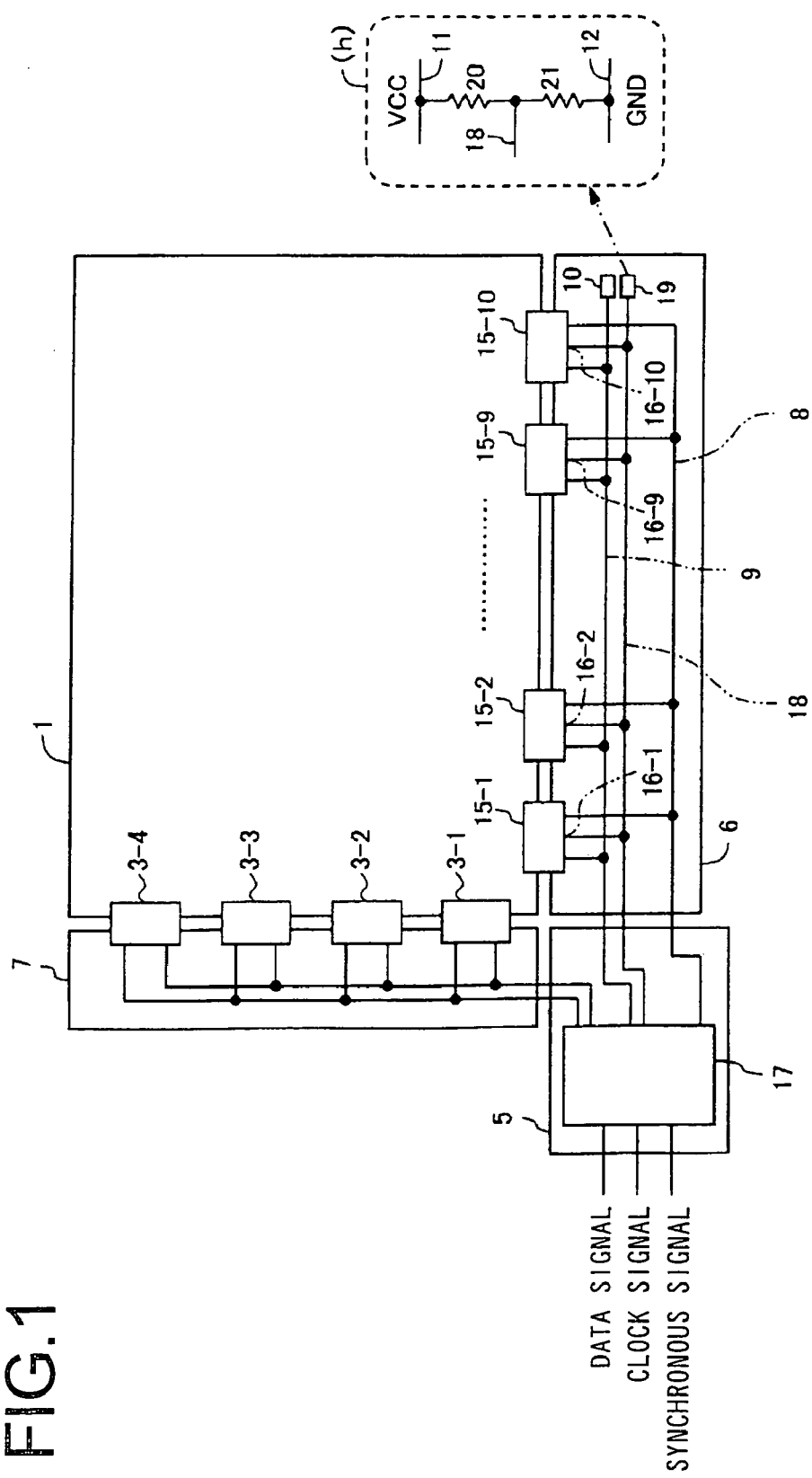
FIG. 1 is a diagram showing the schematic construction of a main part of a first embodiment according to the present invention.
Figure 2:
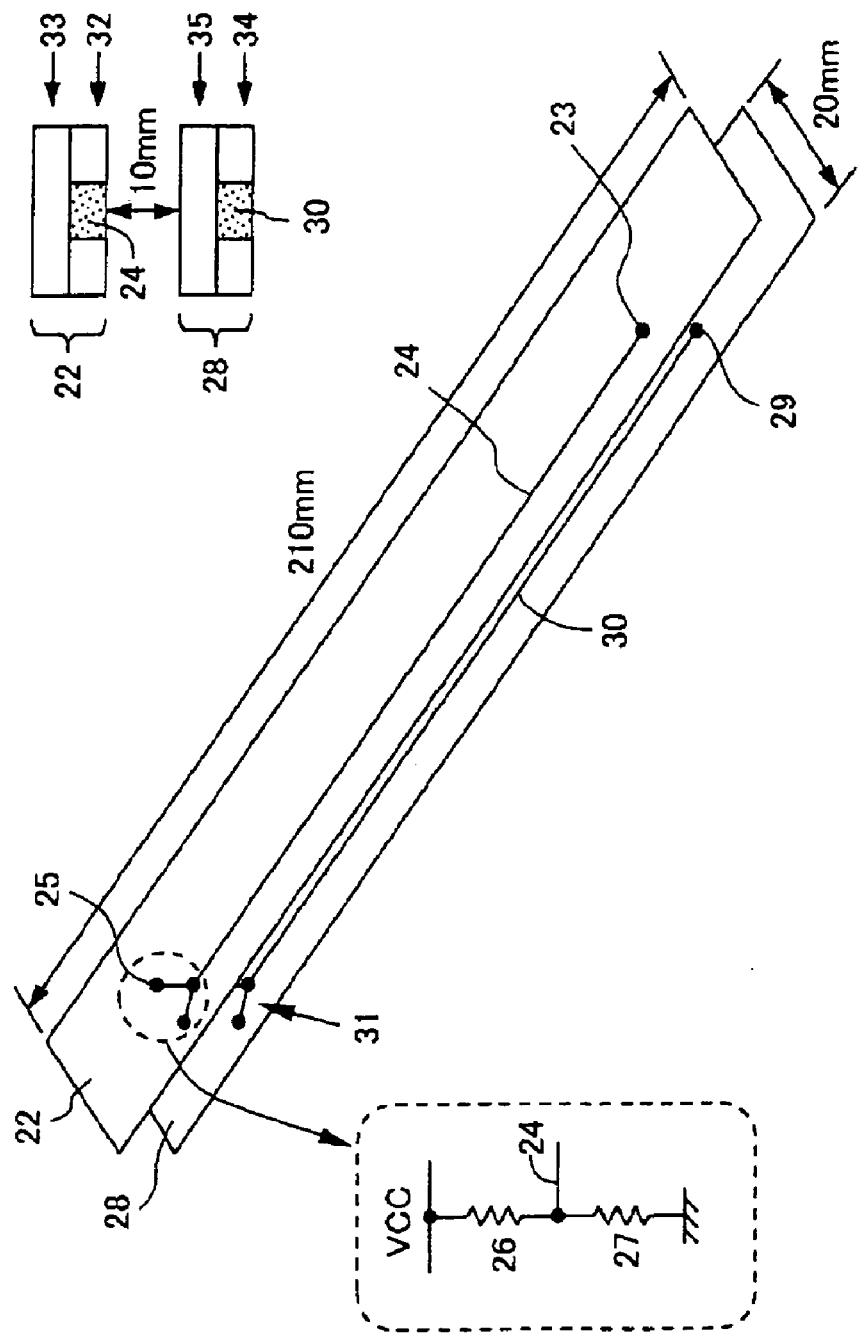
FIGS. 2A and 2B are diagrams showing a first clock signal line model used for a first simulation executed by the inventor to verify the effect of the first embodiment of the invention.

FIG. 1 is a diagram showing the schematic construction of a main part of a first embodiment according to the present invention. The first embodiment of the present invention is equipped with data driver ICs 15-1 to 15-10 (the data driver ICs 15-3 to 15-8 are omitted from the illustration) which are different in structure from the data driver ICs 2-1 to 2-10 shown in FIG. 19. Each of the data driver ICs 15-1 to 15-10 has a dummy terminal 16-1 to 16-10, and the other construction is designed to be well known.

Figure 19:
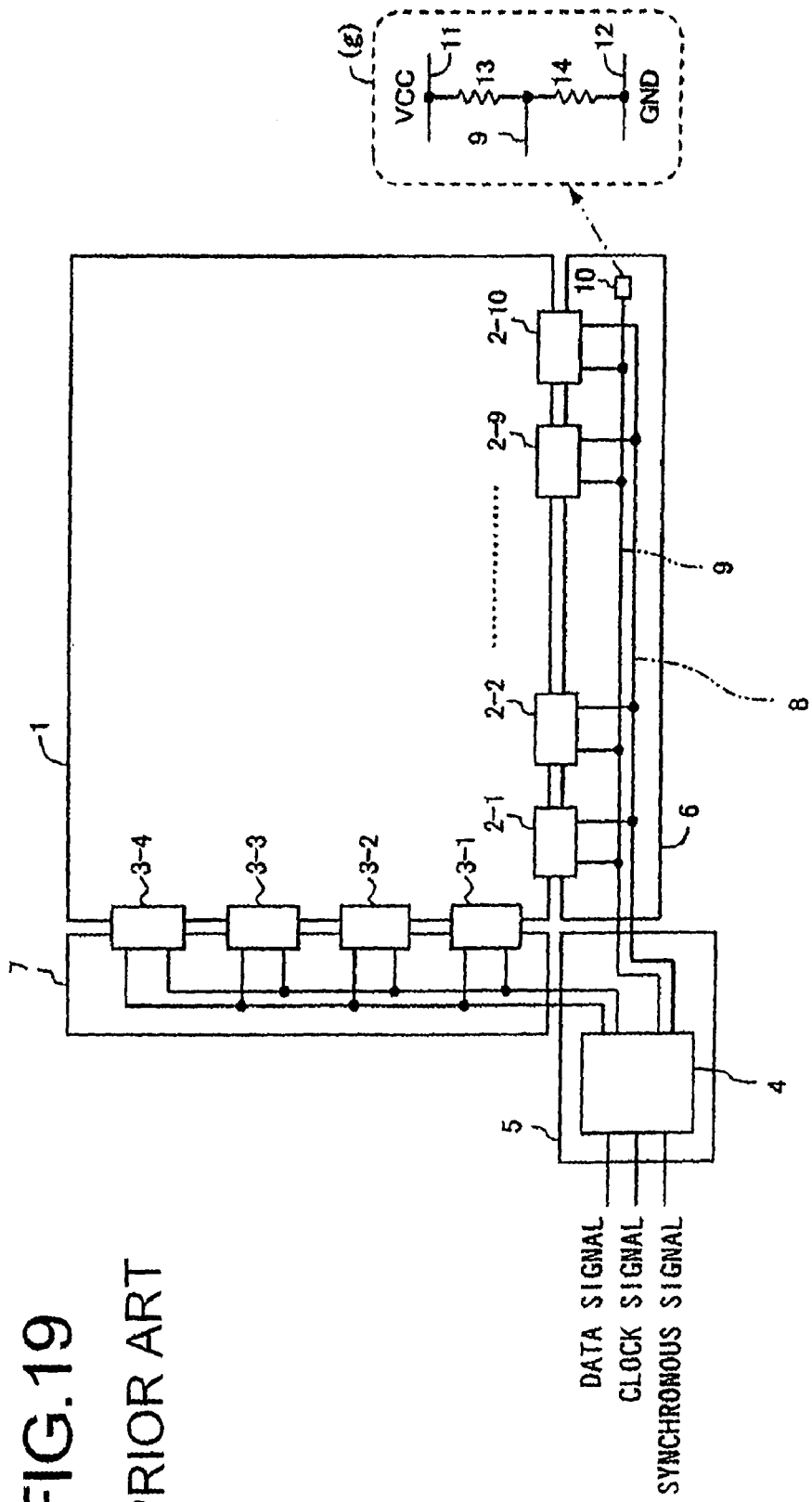
FIG. 19 is a diagram showing the construction of a main part of the conventional liquid crystal display device.

Furthermore, the first embodiment is equipped with a timing controller 17 different in circuit construction from the timing controller 4 shown in FIG. 19. The timing controller 17 is designed to output a clock signal and another clock signal which is in reverse relation with the former clock signal. The latter clock signal thus reversed will be hereinafter referred to as a reverse clock signal. The other construction of the timing controller 17 is designed to be well known.

Furthermore, the first embodiment is equipped with a reverse clock signal line 18 which is formed in parallel to the clock signal line 9 and transmits the reverse clock signal output from the timing controller 17, and a terminating circuit 19 at the terminal portion of the reverse clock signal line 18. In FIG. 1, (h) shows the circuit construction of the terminating circuit 19, and reference numerals 20, 21 represent terminating resistors.

In this embodiment, the clock signal line 9 is connected to the normal clock input terminals of the data driver ICs 15-1 to 15-10, and the reverse clock signal line 18 is connected to the dummy terminals 16-1 to 16-10 of the data driver ICs 15-1 to 15-10. The other construction is substantially the same as the conventional liquid crystal display device shown in FIG. 19.

Figure 3:
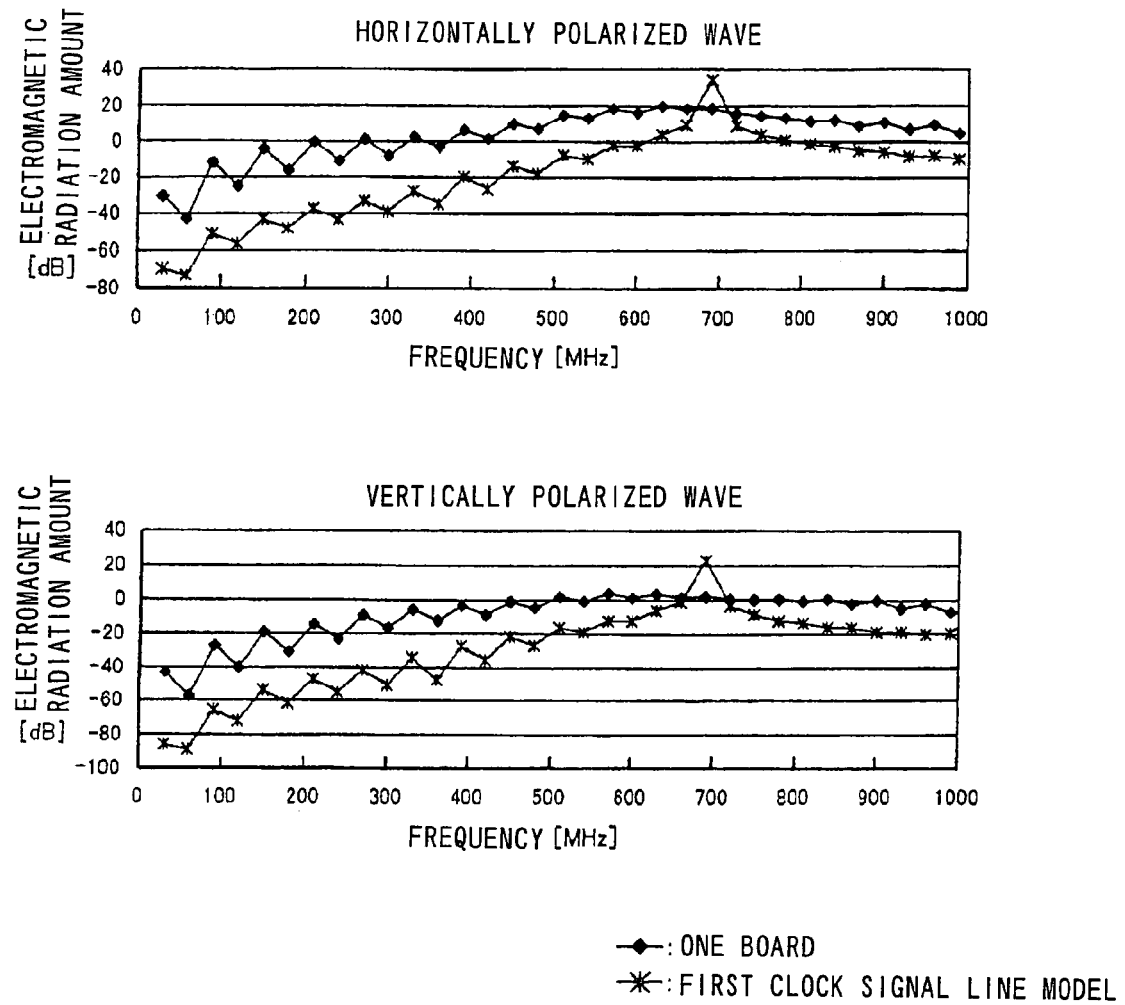
FIG. 3 is graphs showing the results of the first simulation executed by the inventor to verify the effect of the first embodiment of the present invention.
Figure 4:
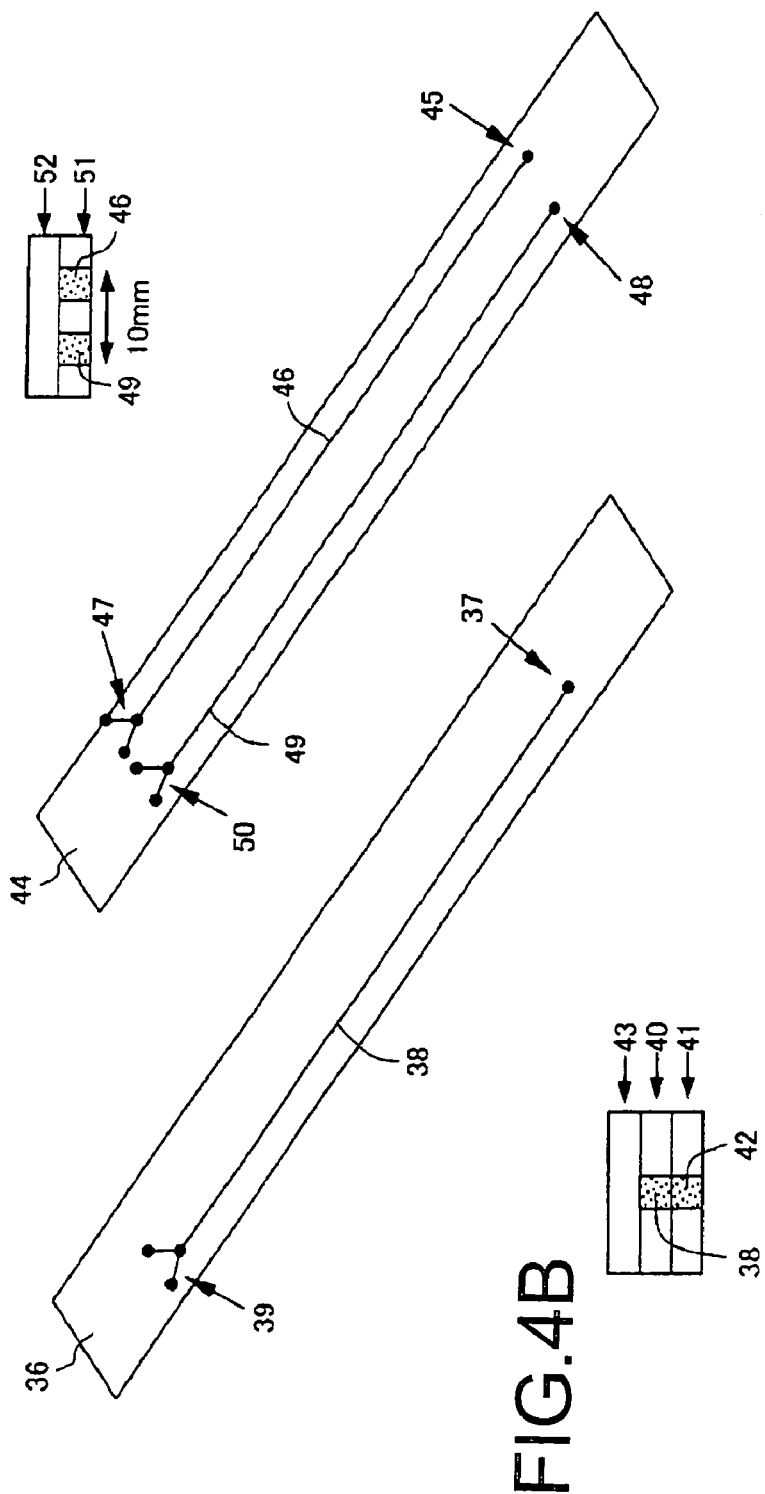
FIGS. 4A-4D are diagrams showing a clock signal line model used for a second simulation executed by the inventor to verify the effect of the first embodiment of the present invention.

FIGS. 2A, 2B and 3 are diagram and graphs showing a first simulation executed by the inventor to verify the effect of the first embodiment of the present invention. FIGS. 2A and 2B are diagrams showing a first clock signal line model used for the first simulation, wherein FIG. 2A is a schematic perspective view and FIG. 2B is a schematic cross-sectional view.

In FIG. 2A, reference numeral 22 represents a print board, reference numeral 23 represents a clock signal source IC, reference numeral 24 represents a clock signal line for transmitting a clock signal output from the clock signal source IC 23, reference numeral 25 represents a terminating circuit equipped at the terminal portion of the clock signal line 24 and reference numerals 26, 27 represent terminating resistors.

Reference numeral 28 represents a print board disposed in parallel to the print board 22, and reference numeral 29 represents a reverse clock signal source IC for outputting a reverse clock signal in reverse relation with the clock signal output from the clock signal source IC 23.

Reference numeral 30 represents a reverse clock signal line for transmitting the reverse clock signal output from the reverse clock signal source IC 29, and reference numeral 31 represents a terminating circuit equipped at the terminal portion of the reverse clock signal line 30. The terminating circuit 31 has the same construction as the terminating circuit 25.

The print boards 22, 28 are designed to have dimension of 210 mm×20 mm and disposed to be spaced from each other at an interval of 10 mm. The clock signal line 24 and the reverse clock signal line 30 are designed to have a length of 160 mm and a width of 0.1 mm and the terminating resistors 26, 27 are designed to have a resistance value of 120Ω.

In FIG. 2B, in the print board 22, reference numeral 32 represents a clock signal layer, and reference numeral 33 represents a GND solid layer. A dielectric layer between the clock signal line 24 and the GND solid layer 33 is omitted from the illustration.

In the print board 28, reference numeral 34 represents a reverse clock signal layer, and reference numeral 35 represents a GND solid layer. A dielectric layer between the reverse clock signal line 30 and the GND solid layer 35 is omitted from the illustration. The clock signal layer 32, the reverse clock signal layer 34 and the GND solid layers 33, 35 are formed to have a thickness of 0.1 mm.

In the clock signal line model thus constructed, the load capacitance of the clock signal line 24 and the load capacitance of the reverse clock signal line 30 are equal to each other, and thus the effect of the first embodiment of the first aspect can be verified.

FIG. 3 shows the results of the first simulation. The first simulation shows the comparison result between the electromagnetic radiation amount (noise level) of the first clock signal line model shown in FIG. 2 and the electromagnetic radiation amount when only one print board 22 is provided. It is apparent from the first simulation that the electromagnetic radiation amount is more greatly reduced as a whole in the case of the clock signal line model shown in FIG. 2 except that the electromagnetic radiation amount is reversed in the neighborhood of 690 MHz.

FIGS. 4A to 4D and FIG. 5 are diagrams showing a second simulation executed by the inventor to verify the effect of the first embodiment of the present invention. FIGS. 4A to 4D are diagrams showing a clock signal line model used for the second simulation, wherein FIG. 4A is a schematic perspective view showing a model of the second clock signal line, FIG. 4B is a schematic cross-sectional view showing the second clock signal line model, FIG. 4C is a schematic perspective view showing a third clock signal line model, and FIG. 4C is a schematic cross-sectional view showing the third clock signal line model.

In FIG. 4A, reference numeral 36 represents a print board, reference numeral 37 represents a clock signal source IC, reference numeral 38 represents a clock signal line for transmitting the clock signal output from the clock signal source IC 37, and reference numeral 39 represents a terminating circuit equipped to the terminal portion of the clock signal line 38.

In FIG. 4B, reference numeral 40 represents a clock signal layer, reference numeral 41 represents a reverse clock signal layer, and reference numeral 42 represents a reverse clock signal line for transmitting the reverse clock signal output from the reverse clock signal source (not shown) for outputting the reverse clock signal in reverse relation with the clock signal output from the clock signal source IC 37, and it is formed in parallel to the clock signal line 38 so as to have the same length as the clock signal line 38.

Reference numeral 43 represents a GND solid layer, and the dielectric layer between the clock signal layer 40 and the reverse clock signal layer 41 and the dielectric layer between the reverse clock signal layer 41 and the GND solid layer 43 are omitted from the illustration. The terminating circuit equipped in connection with the reverse clock signal line 42 is omitted from the illustration. The clock signal layer 40, the reverse clock signal layer 41 and the GND solid layer 43 are formed to have a thickness of 0.1 mm.

In FIG. 4C, reference numeral 44 represents a print board, reference numeral 45 represents a clock signal source IC, reference numeral 46 represents a clock signal line for transmitting the clock signal output from the clock signal source IC 45, and reference numeral 47 represents a terminating circuit equipped to the terminal portion of the clock signal line 46.

Reference numeral 48 represents a reverse-clock signal source IC for outputting the reverse clock signal in reverse relation with the clock signal output from the clock signal source IC 45, reference numeral 49 represents a reverse clock signal line for transmitting the reverse clock signal output from the reverse clock signal source IC 48, and reference numeral 50 represents a terminating circuit equipped to the terminal portion of the reverse clock signal line 49.

In FIG. 4D, reference numeral 51 represents a clock signal layer, and reference numeral 52 represents a GND solid layer. The dielectric layer between the clock signal layer 51 and the GND solid layer 52 is omitted from the illustration. The thicknesses of the clock signal layer 51 and the GND solid layer 52 are set to 0.1 mm. The interval between the clock signal line 46 and the reverse clock signal line 49 is set to 10 mm. The frequency of each of the clock signal and the reverse clock signal is set to 30 MHz.

Figure 5:
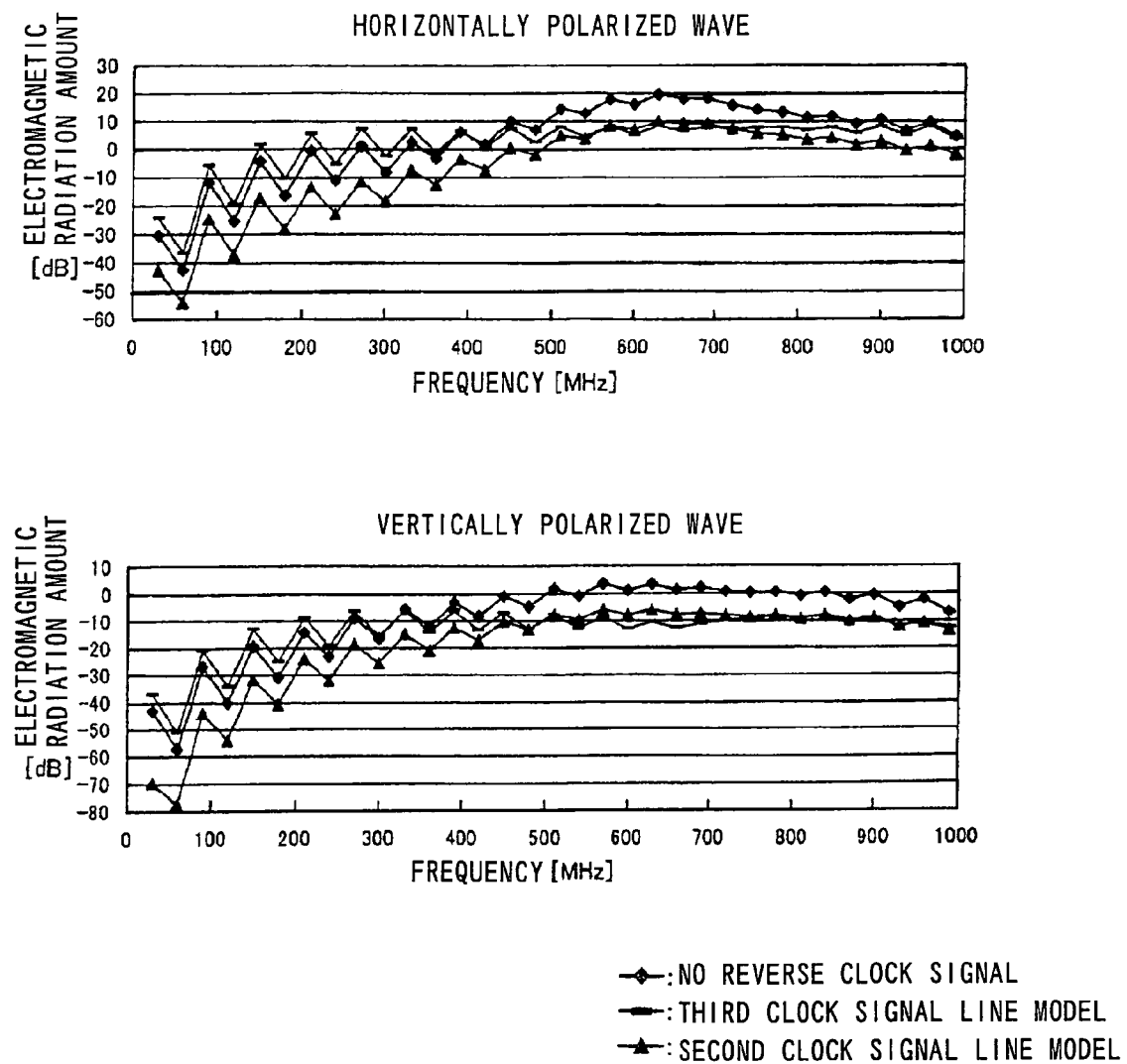
FIG. 5 is graphs showing the results of the second simulation executed by the inventor to verify the effect of the first embodiment of the present invention.

FIG. 5 is graphs showing the results of the second simulation. In comparison with a case where there is no reverse clock, in the second clock signal line model (adjacent layer travel model) shown in FIG. 4A, the electromagnetic radiation amount is smaller in the overall frequency area. In the case of the third clock signal line model (same layer travel model) shown in FIG. 4B, the electromagnetic radiation amount is larger by 5 dB at the maximum at frequencies of less than 390 MHz, however, the electromagnetic radiation amount is smaller at frequencies of 390 MHz or more in comparison with the case where there is no reverse clock signal.

Figure 6A:
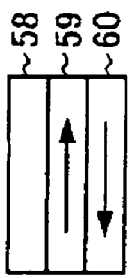
FIGS. 6A-6F are schematic cross-sectional view showing a clock signal line model used for a third simulation executed by the inventor to verify the effect of the first embodiment of the present invention.
Figure 6B:
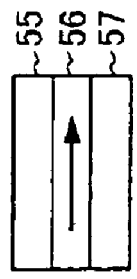
Figure 6C:
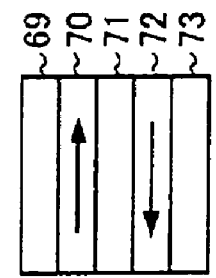
Figure 6D:
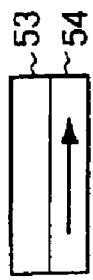
Figure 6E:
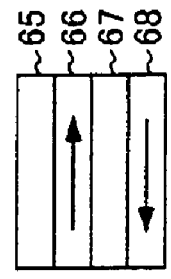
Figure 6F:
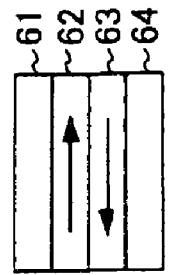

FIGS. 6A to 6F and FIG. 7 are diagrams showing a third simulation executed by the inventor to verify the effect of the first embodiment of the present invention. FIGS. 6A to 6F are schematic cross-sectional views showing clock signal line models used for the third simulation, wherein FIG. 6A shows a conventional clock signal line model, FIG. 6B shows another conventional clock signal line model, FIG. 6C shows a fourth clock signal line model, FIG. 6D shows a fifth clock signal line model, FIG. 6E shows a sixth clock signal line model and FIG. 6F shows a seventh clock signal line model.

In FIG. 6A, reference numeral 53 represents a GND solid layer, and reference numeral 54 represents a clock signal layer. In FIG. 6B, reference numeral 55 represents a GND solid layer, reference numeral 56 represents a clock signal layer and reference numeral 57 a VCC solid layer. In FIG. 6C, reference numeral 58 represents a GND solid layer, reference numeral 59 represents a clock signal layer and reference numeral 60 represents a reverse clock signal layer.

In FIG. 6D, reference numeral 61 represents a GND solid layer, reference numeral 62 represents a clock signal layer, reference numeral 63 represents a reverse clock signal layer and reference numeral 64 represents a VCC solid layer. In FIG. 6E, reference numeral 65 represents a GND solid layer, reference numeral 66 represents a clock signal layer, reference numeral 67 represents a GND solid layer and reference numeral 68 represents a reverse clock signal layer. In FIG. 6F, reference numeral 69 represents a GND solid layer, reference numeral 70 represents a clock signal layer, reference numeral 71 represents a GND solid layer, reference numeral 72 represents a reverse clock signal layer and reference numeral 73 represents a VCC solid layer.

FIG. 7 shows the results of the third simulation, and the simulation results of the respective models shown in FIGS. 6A to 6F. It is apparent that the electromagnetic radiation amount (noise level) can be reduced in the overall frequency area substantially at the same degree in the fifth clock signal line model shown in FIG. 6D and the seventh clock signal line model shown in FIG. 6F as compared with the conventional clock signal line models shown in FIGS. 6A and 6B.

This is because the basic construction is a strip-line design (the upper and lower layers of the signal layer are solid layers of GND or a power source, and also the offset effect is generated by the reverse clock signal. In the case of only the strip-line design, the conventional clock signal line model shown in FIGS. 6A and 6B cannot provide any remarkable effect of reducing the electromagnetic radiation.

Figure 8:
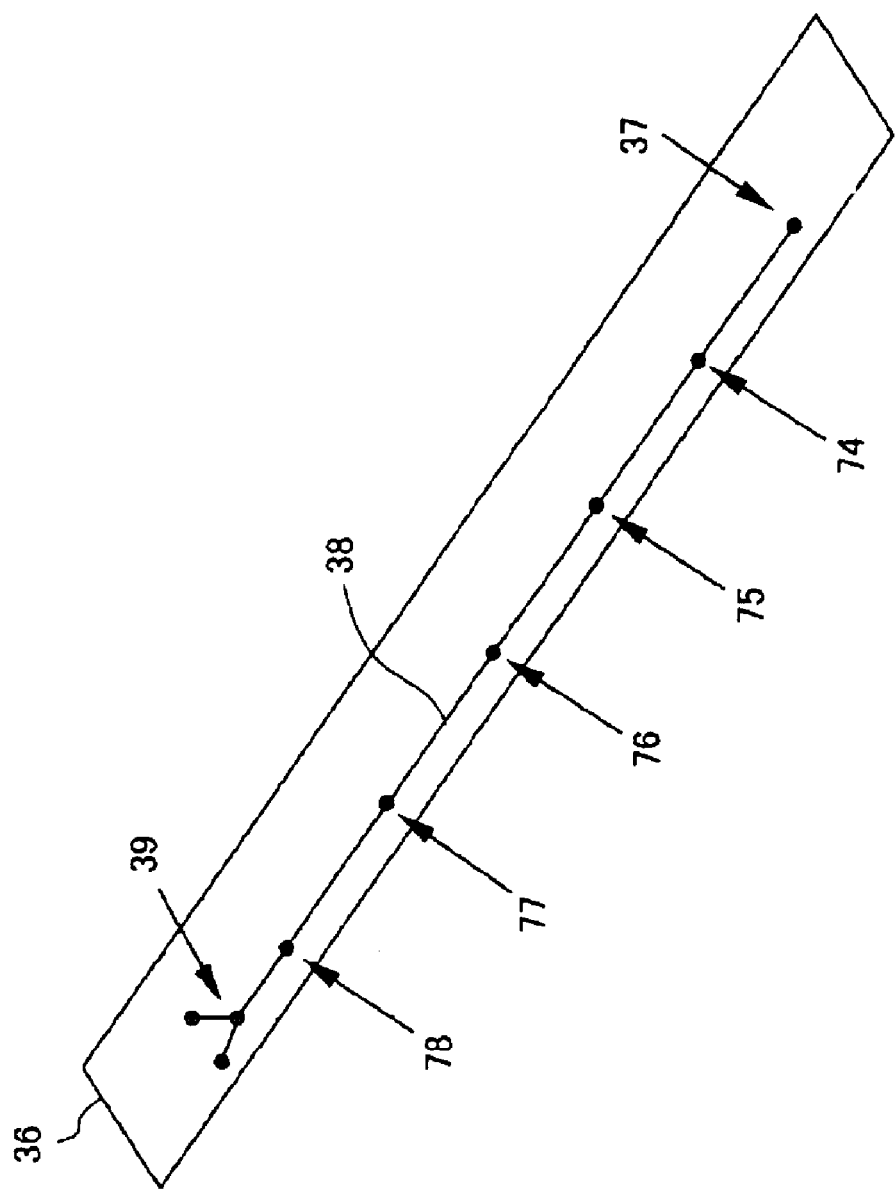
FIG. 8 is a diagram showing an eighth clock signal line model used for a fourth simulation executed by the inventor to verify the effect of the first embodiment of the invention.
Figure 9:
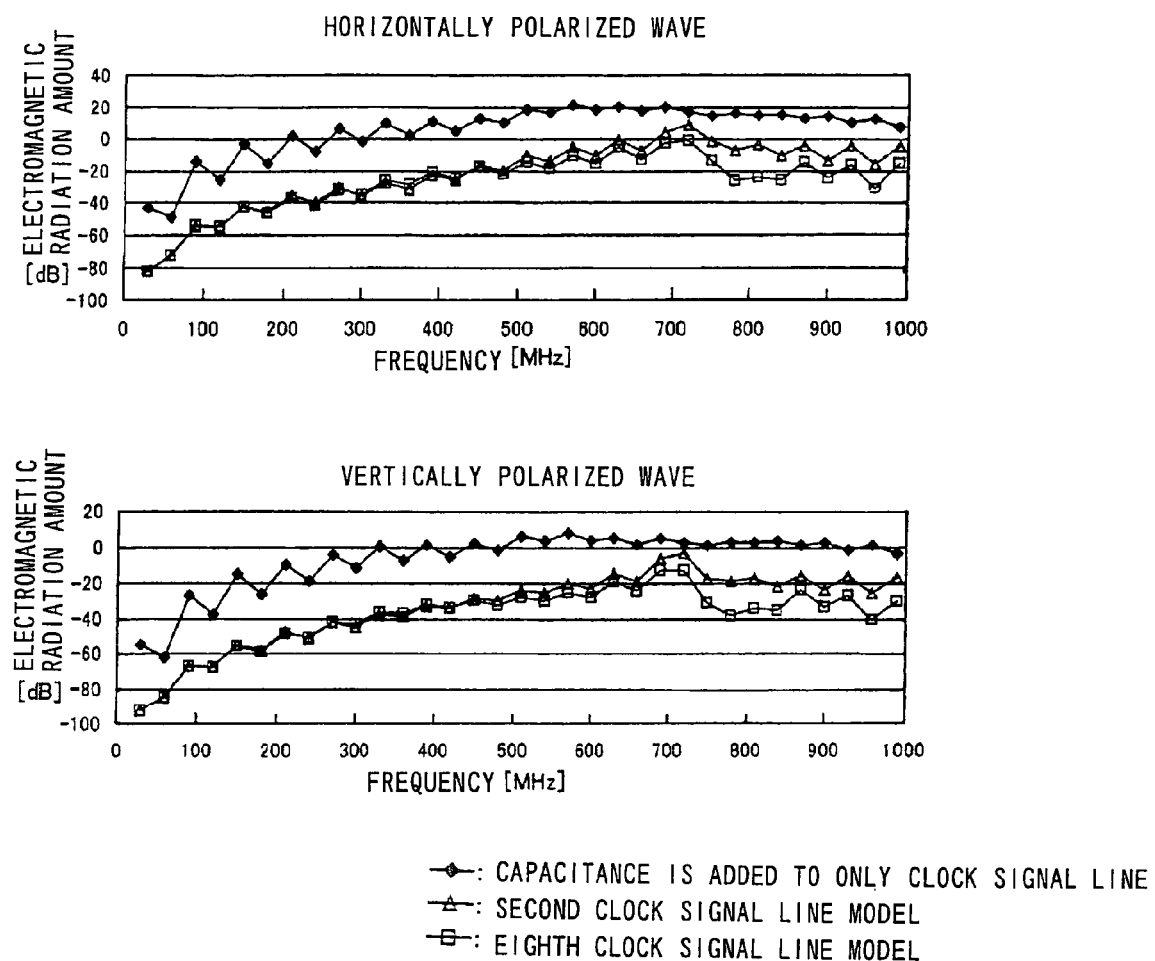
FIG. 9 is graphs showing the results of the fourth simulation executed by the inventor to verify the effect of the first embodiment of the invention.

FIGS. 8 and 9 are diagrams showing a fourth simulation executed by the inventor to verify the effect of the first embodiment of the present invention. FIG. 8 shows an eighth clock signal line model used for the fourth simulation.

In FIG. 8, reference numerals 74 to 78 represent capacitors of 5 pF, and the eighth clock signal line model is achieved by connecting the capacitors 74 to 78 to the second clock signal line model shown in FIG. 4A. The capacitors connected to the reverse clock signal line and the reverse clock signal line are omitted from the illustration. 5 pF corresponds to the clock input capacity of the data driver IC.

FIG. 9 shows fourth simulation results. FIG. 9 shows the simulation result of a model in which no capacitance is added to the reverse clock signal line and capacitance is added to only the clock signal line, the simulation result of the second clock signal line model and the simulation result of the eighth clock signal line.

As comparison with the second clock signal line model, the radiation amount is increased in the model in which the capacitance is added to only the clock signal line. However, the electromagnetic radiation is more greatly reduced in the case of the eighth clock signal line model than in the case of the second clock signal line model. Accordingly, it is apparent that it is required to set the same load condition between the clock signal line and the reverse clock signal line.

As described above, according to the first embodiment, the reverse clock signal line 18 is equipped in parallel to the clock signal line 9, the reverse clock signal line 18 is connected to the dummy terminals 16-1 to 16-10 of the data driver ICs 15-1 to 15-10, the load capacitance of the clock signal and the load capacitance of the reverse clock signal are made substantially equal to each other, and the clock signal and the reverse clock signal are output from the timing controller 17 to the clock signal line 9 and the reverse clock signal line 18, respectively. Therefore, the offset effect can be generated between the clock signal and the reverse clock signal, and the electromagnetic radiation caused by the clock signal can be reduced.

Figure 10:
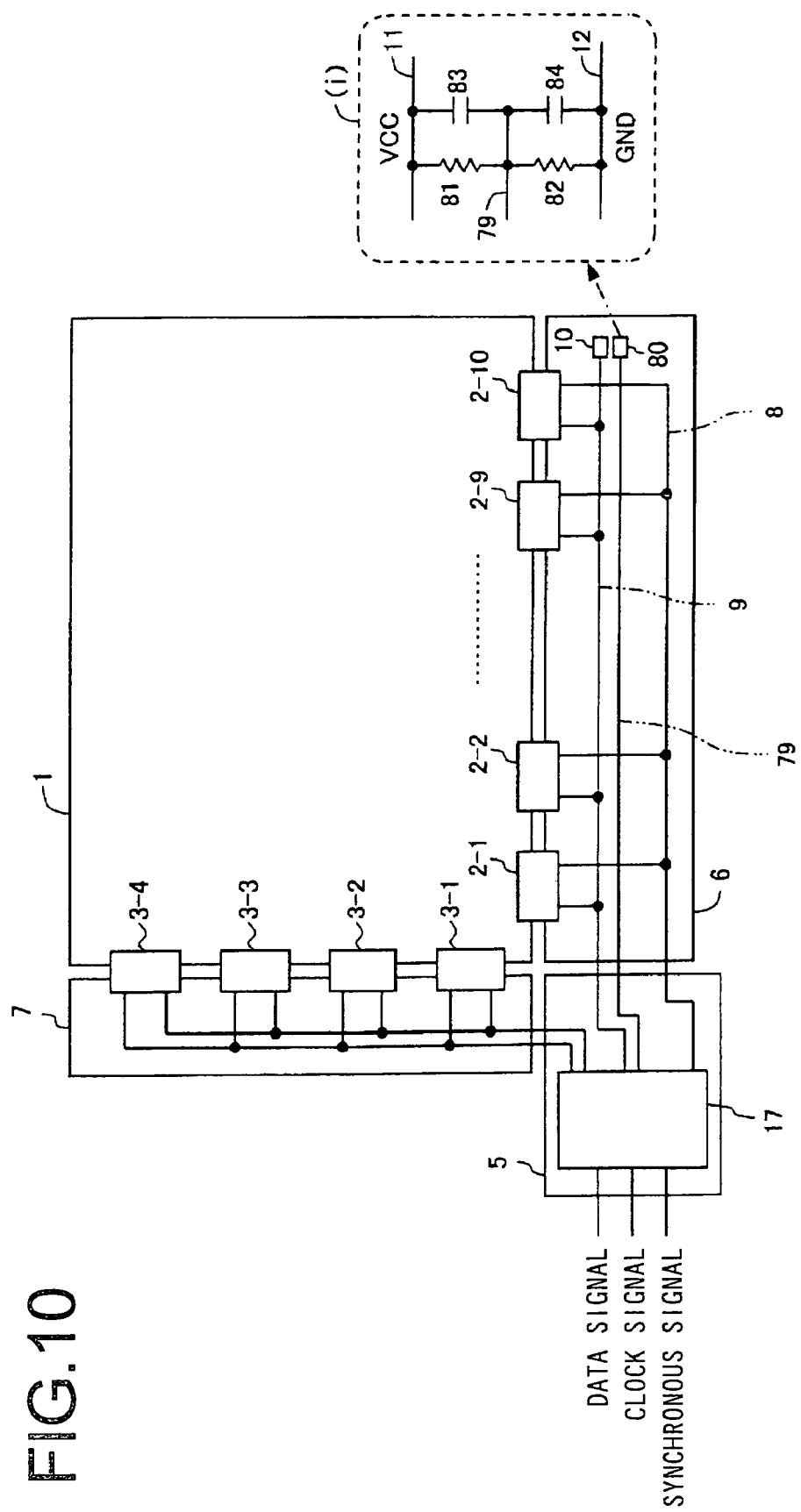
FIG. 10 is a diagram showing the schematic construction of a main part of a second embodiment according to the present invention.

Second Embodiment . . . FIG. 10

FIG. 10 is a diagram showing the schematic construction of a main part of the second embodiment of the present invention. The second embodiment of the present invention is equipped with a timing controller 17 shown in FIG. 1. Furthermore, a reverse clock signal line 79 for transmitting a reverse clock signal output from the timing controller 17 is equipped in parallel to the clock signal line 9, and also a terminating circuit 80 is equipped to the terminal portion of the reverse clock signal line 79.

In FIG. 10, (i) represents a circuit construction of the terminating circuit 80, reference numerals 81, 82 represent terminating resistors, and reference numerals 83, 84 represent capacitors equipped so that the load capacitance of the reverse clock signal line 79 is equal or substantially equal to the load capacitance of the clock signal line. The composite capacitance value of the capacitors 83, 84 are set as the total values of the clock input capacitance of the data driver ICs 2-1 to 2-10. The other construction is substantially the same as the conventional liquid crystal display device shown in FIG. 19.

As described above, according to the second embodiment of the present invention, the reverse clock signal line 79 is equipped in parallel to the clock signal line 9, the capacitors 83, 84 are equipped to the terminating circuit 80, the load capacitance of the clock signal and the load capacitance of the reverse clock signal are set to be equal or substantially equal to each other, and the clock signal and the reverse clock signal are output from the timing controller 17 to the clock signal line 9 and the reverse clock signal line 79 respectively. Therefore, the offset effect is generated between the clock signal and the reverse clock signal, and the electromagnetic radiation caused by the clock signal can be reduced.

Third Embodiment . . . FIGS. 11 to 14

Figure 11:
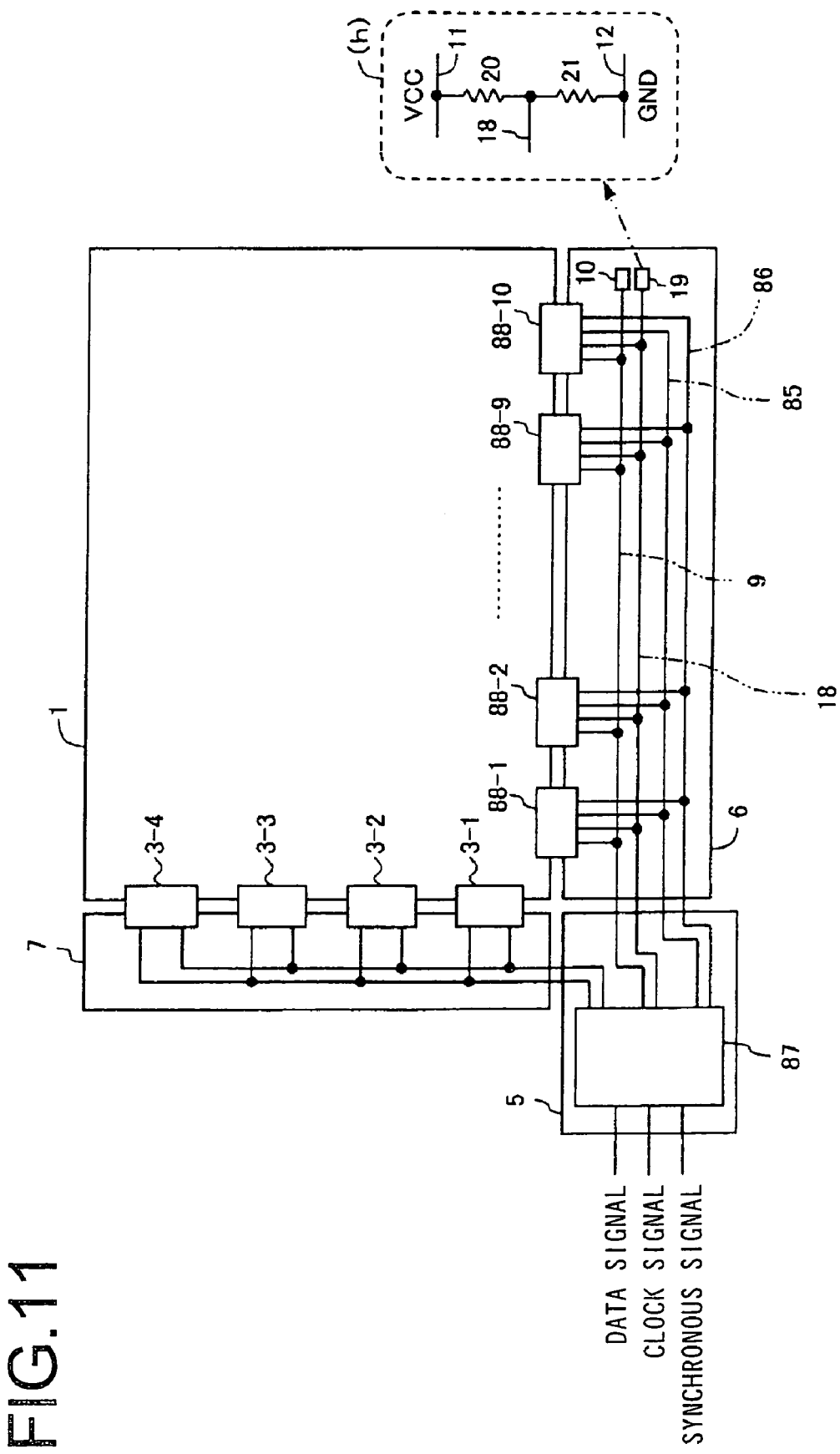
FIG. 11 is a diagram showing the schematic construction of a main part of a third embodiment according to the present invention.

FIG. 11 is a diagram showing the schematic construction of a main part of a third embodiment according to the present invention. In FIG. 11, reference numeral 85 represents a data signal line for odd-number dots through which data signals of odd-number dots are transmitted, and reference numeral 86 represents a data signal line for even-number dots through which data signals of even-number dots are transmitted.

The third embodiment of the present invention is equipped with a timing controller 87 and data driver ICs 88-1 to 88-10 which are different in construction from the timing controller 17 and the data driver ICs 15-1 to 15-10 shown in FIG. 1. The data driver ICs 88-3 to 88-8 are omitted from the illustration.

The timing controller 87 is designed so that the data signals of the even-number dots are output while the phase thereof is shifted by 180 degrees with respect to the data signals of the odd-number dots, and the other construction is the same as the timing controller 17 shown in FIG. 1.

The data driver ICs 88-1 to 88-10 are designed so that the clock signal and the reverse signal are input thereto. The other construction thereof is the same as the first embodiment shown in FIG. 1.

Figure 12:
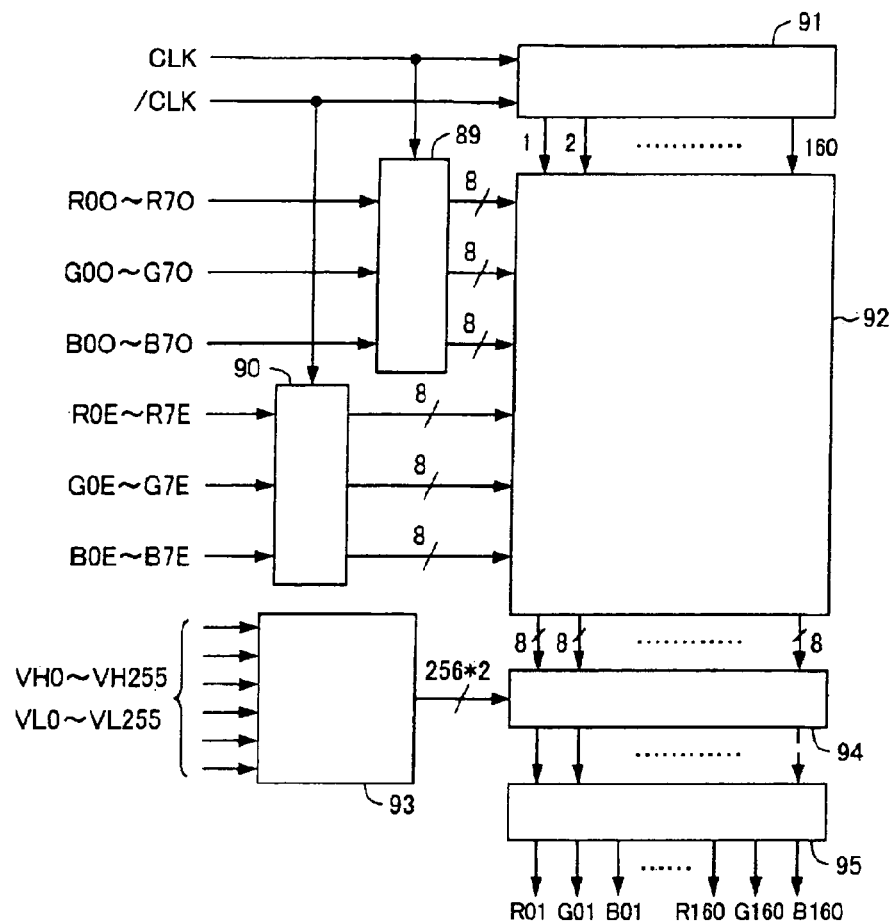
FIG. 12 is a block diagram showing the construction of each data driver IC equipped in the third embodiment of the present invention.

FIG. 12 is a block diagram showing the construction of each of the data driver ICs 88-1 to 88-10. In FIG. 12, CLK represents the clock signal, /CLK represents the reverse clock signal, R0O to R7O represent red data signals of odd-number dots, G0O to G7O represent green data signals of odd-number dots, B0O to B7O represent blue data signals of odd-number dots, R0E to R7E represent red data signals of even-number dots, G0E to G7E represent green data signals of even-number dots, B0E to B7E represent blue data signals of even-number dots and VH0 to VH255, VL0 to VL255 represent reference voltages.

Reference numeral 89 represents a data latch for latching the data signals of the odd-number dots R0O to R7O, G0O to G7O and B0O to B7O in synchronism with the rise-up timing of the clock signal CLK, and reference numeral 90 represents a data latch for latching the data signals of the even-number dots R0E to R7E, G0E to G7E and B0E to B7E in synchronism with the rise-up timing of the reverse clock signal /CLK.

Reference numeral 91 represents a shift register for shifting the clock signal CLK and the reverse clock signal /CLK, and reference numeral 92 represents a sampling memory for alternately sampling and storing the data signals of the odd-number dots R0O to R7O, G0O to G7O, B0O to B7O and the data signals of the even-number dots R0E to R7E, G0E to G7E and B0E to B7E in synchronism with the parallel output of the shift register 91.

Reference numeral 93 represents a reference voltage generating circuit for generating voltages of 256×2 level which are achieved by subjecting the reference voltages VH0 to VH255, VL0 to VL255 to γ-correction, reference numeral 94 represents a D/A converter for converting the data signal of each dot stored in the sampling memory 92 to an analog signal, and reference numeral 95 represents an output circuit for outputting the analog signals of 256 gradations×2.

Figure 13:
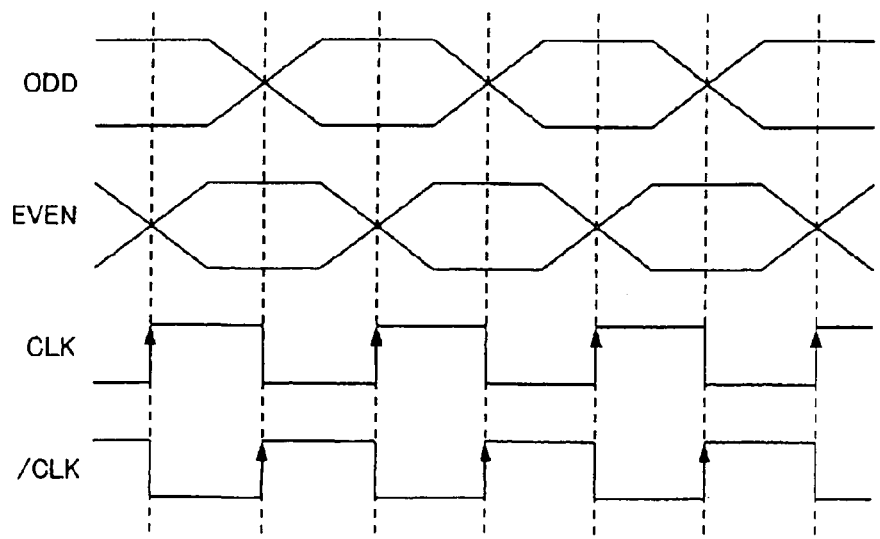
FIG. 13 is a timing chart showing the operation of the third embodiment of the present invention.

FIG. 13 is a timing chart showing the operation of the third embodiment of the present invention, and shows the data signals ODD of odd-number dots, the data signals EVEN of even-number dots, the clock signal CLK and the reverse clock signal /CLK outputted from the timing controller 87.

In the third embodiment of the present invention, the data driver ICs 88-1 to 88-10 latch the data signals ODD of the odd-number dots at the rise-up timing of the clock signal CLK, and latch the data signals EVEN of the even-number dots at the rise-up timing of the reverse clock signal/CLK.

Figure 14:
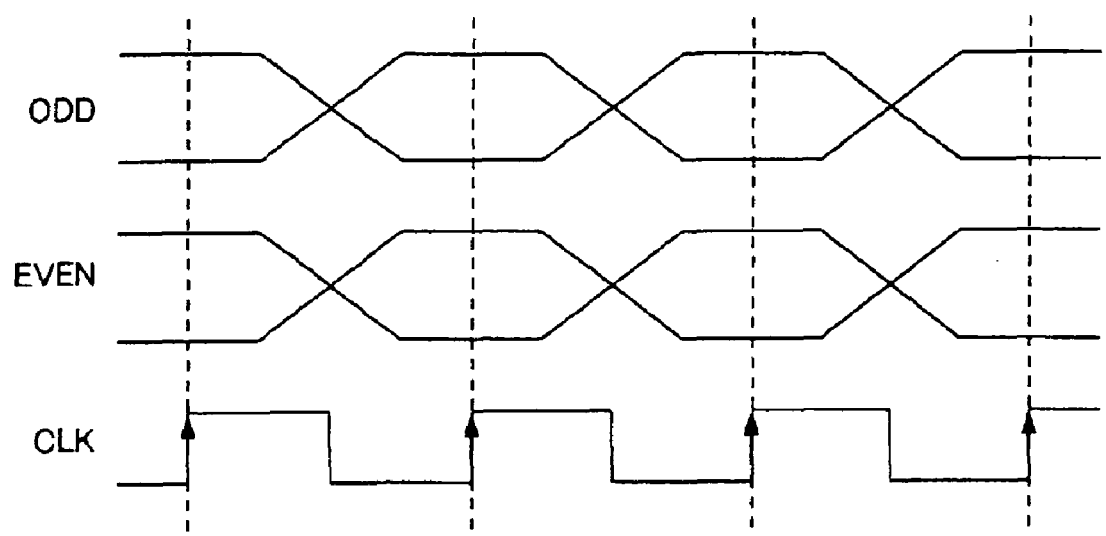
FIG. 14 is a timing chart showing the operation of a conventional liquid crystal display device shown in FIG. 19.

As a result, the simultaneous switching number of the data signals can be set to a half of that of the conventional liquid crystal display device shown in FIG. 19. A timing chart showing the operation of the conventional liquid crystal display device shown in FIG. 19 is shown in FIG. 14.

Accordingly, according to the third embodiment of the present invention, both the clock signal and the reverse clock signal are input to the data driver ICs 88-1 to 88-10, whereby the load capacitance of the clock signal line 9 and the load capacitance of the reverse clock signal line 18 can be set to be equal or substantially equal to each other. Therefore, the offset effect can be generated between the clock signal and the reverse clock signal, and the electromagnetic radiation caused by the clock signal can be reduced. In addition, the simultaneous switching number of the data signals can be set to a half of that of the conventional liquid crystal display device shown in FIG. 19. Therefore, the electromagnetic radiation generated by the simultaneous switching of the data signals can be reduced.

Figure 15:
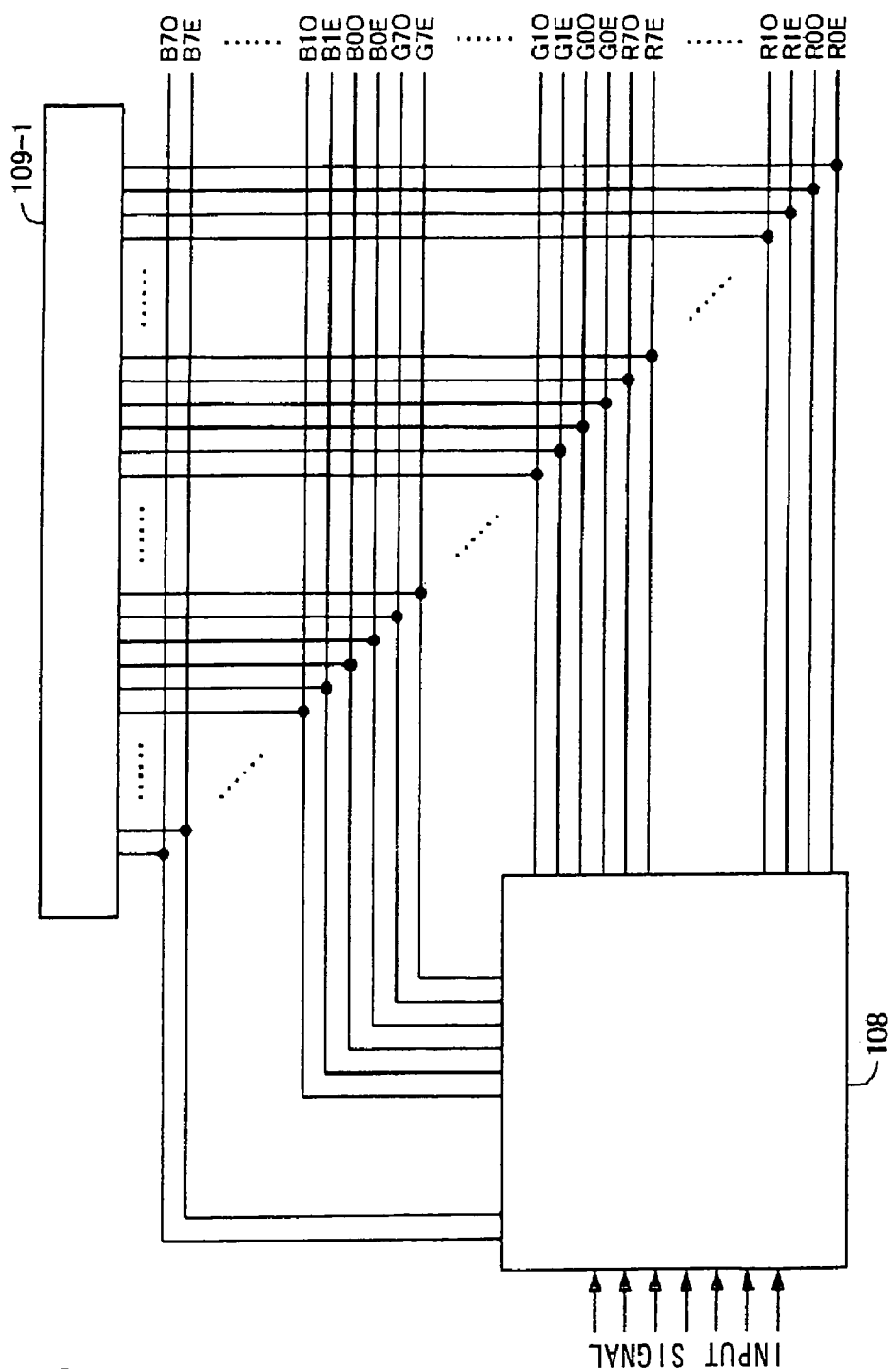
FIG. 15 is a diagram showing the schematic construction of a main part of a fourth embodiment of the present invention.

Fourth Embodiment . . . FIG. 15

FIG. 15 is a diagram showing the schematic construction of a main part of a fourth embodiment of the present invention. The fourth embodiment of the present invention is equipped with a timing controller 108 which is different in pin arrangement from the timing controller 87 shown in FIG. 11, and also with data driver ICs 109-1 to 109-10 which are different in pin arrangement from the data driver ICs 88-1 to 88-10 shown in FIG. 11. The data driver ICs 109-2 to 109-10 are omitted from the illustration.

In the timing controller 108, the output pins for data signals are arranged so that the data signal of an odd-number dot of each bit of each color and the data signal of an even-number dot of the same bit are adjacent to each other. That is, the output pins for red data signals RiO, RiE (i=0, 1, . . . , 7), the output pins for green data signals GiO, GiE and the output pins for blue data signals BiO, BiE are arranged so as to be respectively adjacent to each other.

In the data driver ICs 109-1 to 109-10, the input pins for data signals are arranged so that the data signal of an odd-number dot of each bit of each color and the data signal of an even-number dot of the same bit are adjacent to each other. That is, the output pins for red data signals RiO, RiE, the input pins for green data signals GiO, GiE and the input pins for blue data signals BiO, BiE are arranged to be respectively adjacent to each other.

Therefore, the data signal lines can be arranged so that the data signal of an odd-number dot of each bit of each color and the data signal of an even-number dot of the same bit are adjacent to each other. That is, the data signal lines for red data signals RiO, RiE, the data signal lines for green data signals GiO, GiE and the data signal lines for blue data signals BiO, BiE are arranged to be respectively adjacent to each other. The other construction is the same as the third embodiment shown in FIG. 11.

Figure 16:
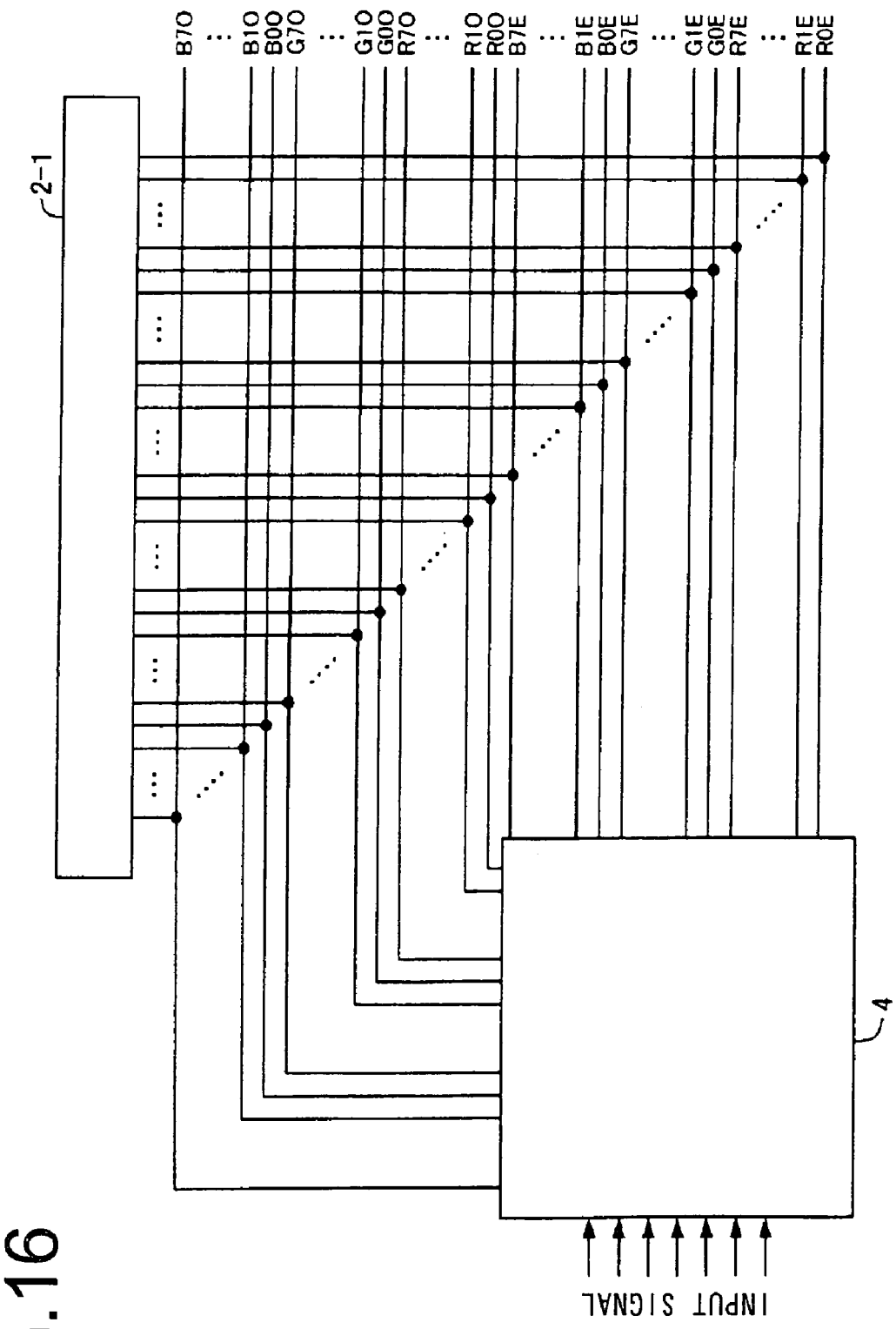
FIG. 16 is a diagram showing the schematic construction of a part of a conventional liquid crystal display device shown in FIG. 19.

FIG. 16 is a diagram showing the schematic construction of a part of the conventional liquid crystal display device shown in FIG. 19, and shows the arrangement of the output pins for data signals of the timing controller 4, the arrangement of the input pins for data signals of the data driver IC 2-1, and the arrangement of the data signal lines.

According to the fourth embodiment of the present invention, the electromagnetic radiation caused by the clock signal can be reduced as in the third embodiment of the present invention. In addition, the data signal lines are arranged so that the data signal of an odd-number dot of each bit of each color and the data signal of an even-number dot of the same bit are adjacent to each other. Therefore, the electromagnetic radiation generated by the simultaneous switching of the data signals can be more greatly reduced than the third embodiment.

Figure 17:
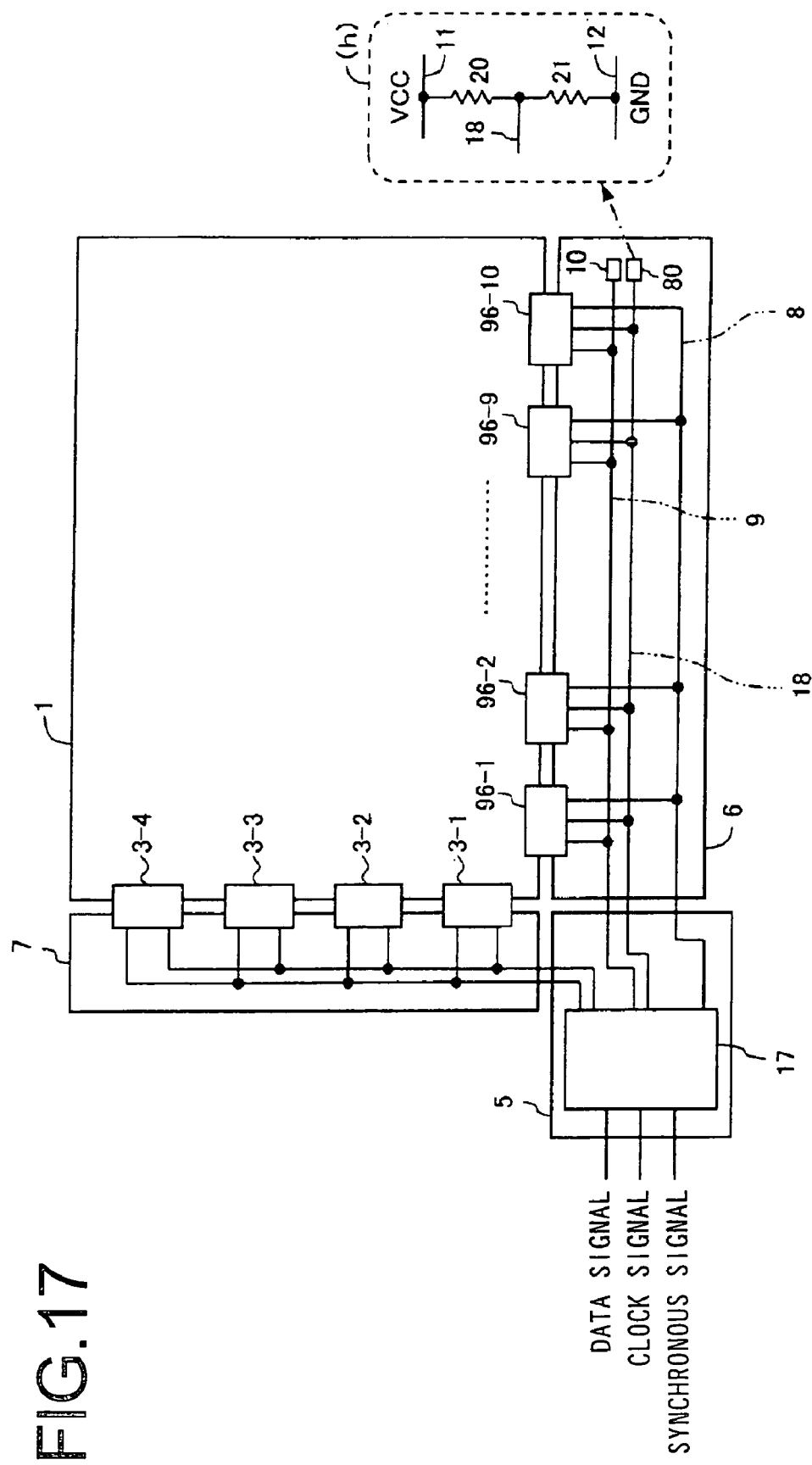
FIG. 17 is a diagram showing the schematic construction of a main part of a fifth embodiment according to the present invention.
Figure 18:
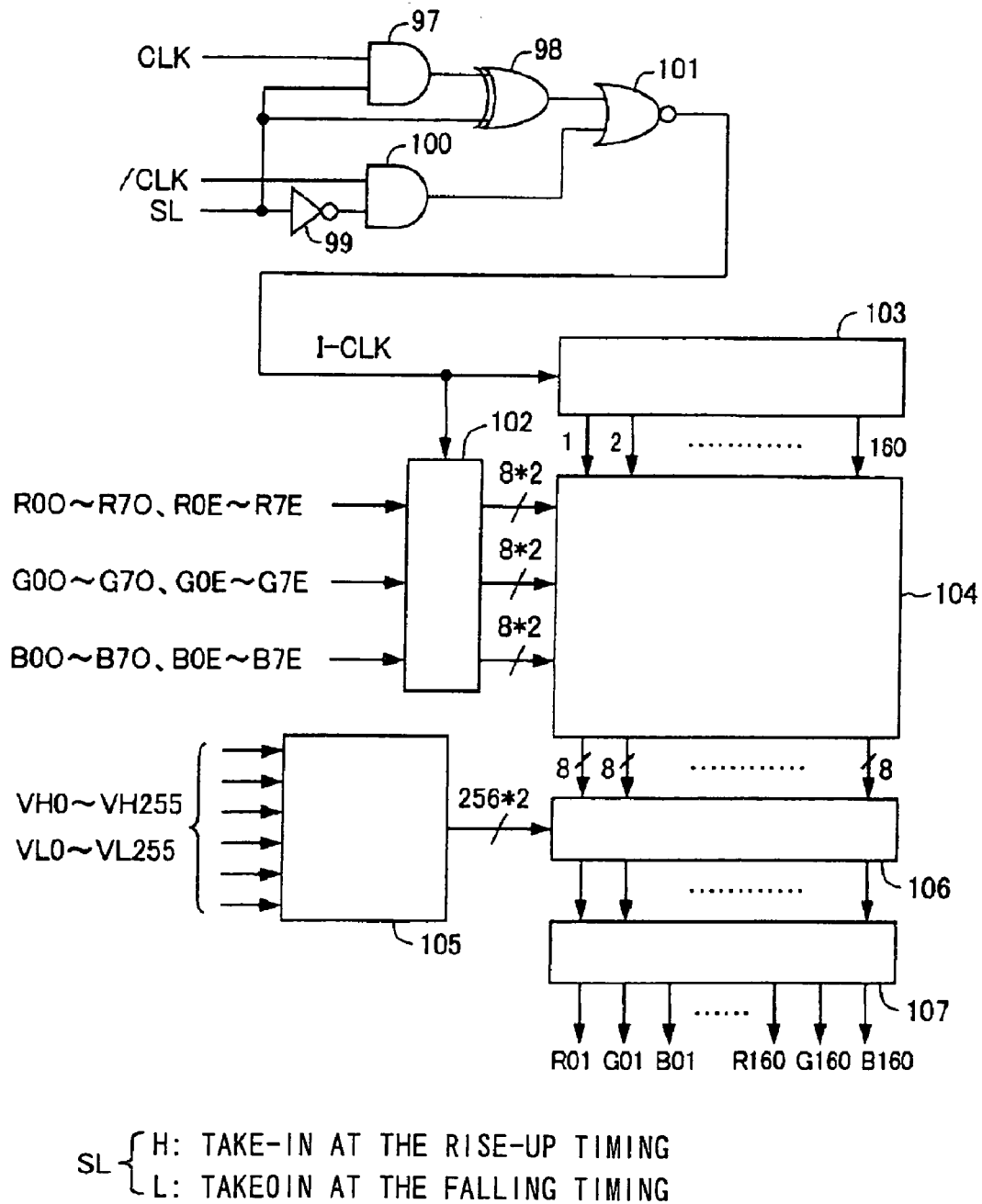
FIG. 18 is a block diagram showing the construction of each data driver IC equipped to a fifth embodiment of the present invention.

Fifth Embodiment . . . FIGS. 17, 18

FIG. 17 is a diagram showing the schematic construction of a main part of a fifth embodiment of the present invention. The fifth embodiment of the present invention is equipped with data driver ICs 96-1 to 96-10 which are different in construction from the data driver ICs 15-1 to 15-10 shown in FIG. 1. The data driver ICs 96-3 to 96-8 are omitted from the illustration.

The data driver ICs 96-1 to 96-10 are designed so that the clock signal and the reverse clock signal are input to these data driver ICs, and the clock signal or the reverse clock signal can be selected with a selection signal. The other construction is the same as the first embodiment of the present invention shown in FIG. 1. With this construction, the load capacitance of the reverse clock signal line and the load capacitance of the clock signal line can be set to be equal to or substantially equal to each other.

FIG. 18 is a block diagram showing the construction of the data driver ICs 96-1 to 96-10. In FIG. 18, SL represents a selection signal for selecting the clock signal CLK or the reverse clock signal /CLK, and it is independently supplied to each of the data driver ICs 96-1 to 96-10.

Reference numeral 97 represents an AND circuit for subjecting the clock signal CLK and the selection signal SL to AND processing, and reference numeral 98 represents an EXOR circuit for subjecting the output of the AND circuit 97 and the selection signal SL to EXOR (exclusive OR) processing.

Reference numeral 99 represents an inverter for inverting the selection signal SL, reference numeral 100 represents an AND circuit for subjecting the reverse clock signal /CLK and the output of the inverter 99 to AND processing, and reference numeral 101 represents an NOR circuit for subjecting the output of the EXOR circuit 98 and the output of the AND circuit 100 to NOR processing and outputting an internal clock signal I-CLK.

Reference numeral 102 represents a data latch for alternately latching data signals of odd-number dots R0O to R7O, G0O to G7O and B0O to B7O, the data signals of even-number dots R0E to R7E, G0E to G7E and B0E to B7E in synchronism with the rise-up timing of the internal clock signal I-CLK.

Reference numeral 103 represents a shift register for shifting the internal clock signal I-CLK, and reference numeral 104 represents a sampling memory for alternately sampling and storing the data signals of odd-number dots R0O to R7O, G0O to G7O and B0O to B7O the data signals of even-number dots R0E to R7E, G0E to G7E and B0E to B7E in synchronism with the parallel output of the shift register 102.

Reference numeral 105 represents a reference voltage generating circuit for generating voltages of 2556×2 level achieved by subjecting the reference voltages VH0 to VH255, VL0 to VL255 to γ-correction, reference numeral 106 represents a D/A converter for converting the data signal of each dot stored in the sampling memory 104 to an analog signal and reference numeral 107 represents an output circuit for outputting the analog signals of 256 gradations×2.

In the data driver IC thus constructed, when the selection signal SL is set to H level, the clock signal CLK is selected. When the selection signal SL is set to L level, the reverse clock signal /CLK is selected. Therefore, the data driver ICs 96-1, 96-3, 96-5, 96-7 and 96-9 set the selection signal SL to H level, and the data drier ICs 96-2, 96-4, 96-6, 96-8 and 96-10 sets the selection signal SL to L level.

As described above, the data driver ICs 96-1, 96-3, 96-5, 96-7 and 96-9 latch the data signals at the rise-up timing of the clock signal CLK, and the data driver ICs 96-2, 96-4, 96-6, 96-8 and 96-10 latch the data signals at the falling timing of the reverse clock signal /CLK.

As described above, according to the fifth embodiment of the present invention, the load capacitance of the clock signal and the load capacitance of the reverse clock signal can be set to be equal or substantially equal to each other. Therefore, the electromagnetic radiation caused by the clock signal can be reduced. In addition, the reverse clock signal line can be also used to take the data signals into the data driver ICs 96-1 to 96-10, and thus wiring can be performed without waste.

The effect of reducing the electromagnetic radiation caused by the clock signal can be maximized by alternately arranging data driver ICs designed to take in the data signals at the rise-up timing of the clock signal and data driver ICs designed to take in the data signals at the falling timing of the reverse clock signal, whose numbers are equal to each other. Furthermore, the effect is larger as the pitch between the clock signal input pin and the reverse clock signal input pin is reduced.

As described above, according to the first aspect of the present invention, the load capacitance of the first clock signal line for transmitting the first clock signal and the load capacitance of the second clock signal line for transmitting the second clock signal in reverse relation with the first clock signal can be set to be equal or substantially equal to each other. Therefore, the offset effect between the first and second clock signals can be generated, and thus the electromagnetic radiation caused by the clock signal can be reduced.

Furthermore, according to the second aspect of the present invention, for example, a half number of data driver ICs latch the data signals with the first clock signal, and the remaining half number of data driver ICs latch the data signals with the second clock signal. Therefore, the load capacitance can be set to be equal or substantially equal between the first and second clock signal lines. Accordingly, the offset effect is generated between the first and second clock signal, and the electromagnetic radiation caused by the clock signal can be reduced.

What is claimed is:

1. A liquid crystal display device comprising:
a liquid crystal display panel;
a plurality of data driver integrated circuits (ICs) for driving data lines of the liquid crystal display panel;
a first clock signal line for transmitting a first clock signal to the plurality of data driver ICs;
a second clock signal line which is equipped in parallel with the first signal line and transmits a second clock signal which is in reverse relation with the first clock signal;
a timing controller for outputting the first and second clock signals to the first and second clock signal lines respectively; and
load means for making the load capacitance of the second clock signal line equal to or substantially equal to the load capacitance of the first clock signal line.

2. The liquid crystal display device according to claim 1, wherein the load means is constructed by equipping dummy terminals to the data driver ICs, and connecting the second clock signal line to the dummy terminals.

3. The liquid crystal display device according to claim 1, wherein the load means is constructed by containing a capacitor in a terminating circuit.

4. The liquid crystal display device according to claim 3, wherein the capacitor has the same capacitance value as the input capacitance of the first clock signal input terminals of the data driver ICs.

5. The liquid crystal display device according to claim 1, wherein a data signal line for odd-number dots for transmitting data signals of odd-number dots and a data signal line for even-number dots for transmitting data signals of even-number dots are equipped, and the timing controller outputs the data signals of the odd-number dots and the data signals of the even-number dots every horizontal line while displacing the phase between the data signals of the odd-number and even-number dots by 180 degrees, and the data driver ICs input the first and second clock signals, latch the data signals of the odd-number dots with the first clock signal and latch the data signals of the even-number dots with the second clock signal.

6. The liquid crystal display device according to claim 5, wherein a data signal of a dot is consisted of a plurality of bits, and
the timing controller has output pins for the data signals arranged so that the data signal of an odd-number dot of each bit of each color and the data signal of an even-number dot of the same bit are adjacent to each other.

* * * * *